(12) United States Patent
Cooper

(10) Patent No.: US 8,898,265 B2
(45) Date of Patent: Nov. 25, 2014

(54) DETERMINING DATA FLOWS IN A NETWORK

(75) Inventor: Mark Cooper, Risley Warrington (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2409 days.

(21) Appl. No.: 11/474,117

(22) Filed: Jun. 22, 2006

(65) Prior Publication Data

US 2007/0016670 A1  Jan. 18, 2007

(51) Int. Cl.
G06F 15/173 (2006.01)
H04L 12/26 (2006.01)
H04L 12/24 (2006.01)

(52) U.S. Cl.
CPC ............ *H04L 43/12* (2013.01); *H04L 41/0213* (2013.01); *H04L 43/026* (2013.01)
USPC ........................................................ 709/223

(58) Field of Classification Search
USPC ................................................ 709/223, 224
See application file for complete search history.

(56) References Cited

U.S. PATENT DOCUMENTS

| | | | | |
|---|---|---|---|---|
| 6,137,782 A * | 10/2000 | Sharon et al. | ................ | 370/255 |
| 6,480,471 B1 * | 11/2002 | VanZante et al. | ............ | 370/252 |
| 6,502,131 B1 * | 12/2002 | Vaid et al. | ................... | 709/224 |
| 7,529,543 B2 * | 5/2009 | Dale | ............................ | 455/419 |
| 2002/0152277 A1 | 10/2002 | Drees | ............................ | 709/208 |
| 2003/0172145 A1 * | 9/2003 | Nguyen | ...................... | 709/223 |
| 2005/0094572 A1 | 5/2005 | Mimura et al. | ............. | 370/252 |
| 2005/0114397 A1 | 5/2005 | Doshi et al. | ................ | 707/104.1 |
| 2005/0157732 A1 * | 7/2005 | Joy et al. | ...................... | 370/401 |

FOREIGN PATENT DOCUMENTS

| | | |
|---|---|---|
| EP | 1 505 768 A2 | 2/2005 |
| GB | 2 335 124 A | 9/1999 |
| GB | 2 395 311 A | 5/2004 |
| WO | 00/05594 | 2/2000 |

\* cited by examiner

*Primary Examiner* — Shripal Khajuria

(57) ABSTRACT

Information about processes executing on a server together with network traffic and network state information such as ARP and routing tables is collected on each server in a network using a small piece of remote software running on the server. This information is sent to or gathered by a central collating and decoding program, which also obtains information from intervening network devices, such as routing tables, access control lists, load balancer maps and so on. This information is decoded to predict how the network traffic would look at all points in the network.

26 Claims, 4 Drawing Sheets

DETERMINING DATA FLOWS IN A NETWORK

FIELD OF THE INVENTION

The present invention relates to networks, particularly but not exclusively to predicting and mapping data flows of arbitrary unknown applications across and at all points in an Internet Protocol (IP) network.

BACKGROUND

Modern enterprise infrastructures typically consist of multiple packet-based networks linked together by a variety of network devices such as routers and firewalls. Network data packets originating from an application source often span multiple subnets and pass through multiple network devices. These traversals cause changes in the appearance of the data packets en route. For example, in an Internet Protocol (IP) based network, a data packet includes source and destination Media Access Control (MAC) and IP addresses, which are altered in transit by intermediate routing devices, as well as by Network Address Translation (NAT), Port Address Translation (PAT) and proxy firewall devices.

These address changes do not necessarily occur in a uniform way. For example, dynamic routing, necessary to provide resilience within large networks, can result in a sequence of packets destined for the same endpoint traversing different routes through the network. The packets may therefore be subject to different address translations.

However, efficient support of an application in a distributed environment requires knowledge of the precise appearance of an application's data flow at all points in a network. Simply knowing the source and destination IP addresses and Transport Control Protocol (TCP) or User Datagram Protocol (UDP) source and destination ports is insufficient, as faults may lie in intermediate subnets.

To complicate matters further, many business networks have grown rapidly, often by acquisition. During these expansions, knowledge of application interactions is lost, typically through the loss of the original application development and support teams. In many cases, the full range of applications in use within an organisation is not known.

SUMMARY OF THE INVENTION

The present invention aims to address the above problems.

According to the invention, there is provided a system for determining data flows within a network configuration, the network configuration comprising a plurality of nodes and a plurality of network devices through which data is routed between the nodes, each of the nodes having a plurality of processes executing thereon, the system comprising a plurality of remote agents for determining information about each of the plurality of nodes and a mapping engine for receiving the determined information from each of the remote agents, the mapping engine being configured to determine the data flows based on the information from the remote agents and configuration information relating to the network devices, wherein each of the remote agents is located at a respective one of the nodes and is arranged to obtain information about processes executing on its respective node.

The mapping engine may be configured to receive the network device configuration information other than from the remote agents, for example, from one or more of periodic uploading of network configuration files into the mapping engine, polling a storage area for configuration files, querying of network devices, monitoring of network updates of the network devices and reception of update messages from the network devices. It may also be configured to receive from the remote agents, information relating to the network device configuration information, so that network configuration information as known by the remote agents is sent to the mapping engine.

A comparison of information obtained from the remote agents and from other sources can indicate an error or lead the mapping engine to replace one set of information with the other, depending on an assessment as to which set of information is more likely to be correct.

The configuration information may comprise information defining how a network device processes data arriving at the device, for example how it routes or otherwise modifies the data.

The nodes may comprise respective servers on which a plurality of applications are executable, each of said applications giving rise to one or more processes, and the information from the remote agents may comprise a list of processes currently executing on the respective servers, and a list of processes communicating over the network configuration. The information from the remote agents may further comprise interface details for each interface supported by the respective servers, as well as routing information defining how data packets are routed from their respective servers to a destination.

The information from the remote agents may further comprise samples of network traffic.

Advantageously, the remote agents do not require prior knowledge of the applications running on the servers.

The system may be configured to link the determined data flows to one or more of the processes executing on a server and may be configured to link the determined data flows to an application executing on the server based on the processes started by the application. The system can therefore link data flows to processes and applications, rather than just to the server on which the application is running.

By linking data flows to applications, the system can allow changes in the traffic flow of an arbitrary application to be predicted and mapped.

The mapping engine may be distributed thoroughout the network configuration. Distributing the mapping agent may assist in spreading the workload and may result in a more resilient system.

The data flows determined by the system may be graphically presented, so that the end to end network path is diagrammed with all intermediate paths and transformations shown.

According to the present invention, there is also provided a method for determining data flows within a network configuration, the network configuration comprising a plurality of nodes and a plurality of network devices through which data is routed between the nodes, the method comprising determining information about each of the plurality of nodes using a remote agent hosted at each node, the determined information comprising information about a plurality of processes executing on each of the plurality of nodes; and receiving the determined information from each of the remote agents at a mapping engine hosted on a further node, the mapping engine being configured to determine the data flows based on the information from the remote agents and configuration information relating to the network devices.

According to the invention, there is further provided a distributed computer program product for determining data flows within a network structure, the network structure comprising a plurality of nodes and a plurality of network devices through which data is routed between the nodes, the product comprising a mapping engine program executable on a first computer for receiving information from each of a plurality of remote agents, each of the plurality of remote agents comprising a remote agent program executable on a second computer remote from the first computer for determining information about the second computer, the mapping engine program being configured to determine the data flows based on the information from the remote agent programs and configuration information relating to the network devices, wherein each of the remote agents is located at a respective one of the nodes and the remote agent program is arranged to obtain information about processes executing on its respective node.

DETAILED DESCRIPTION

Figure 1:
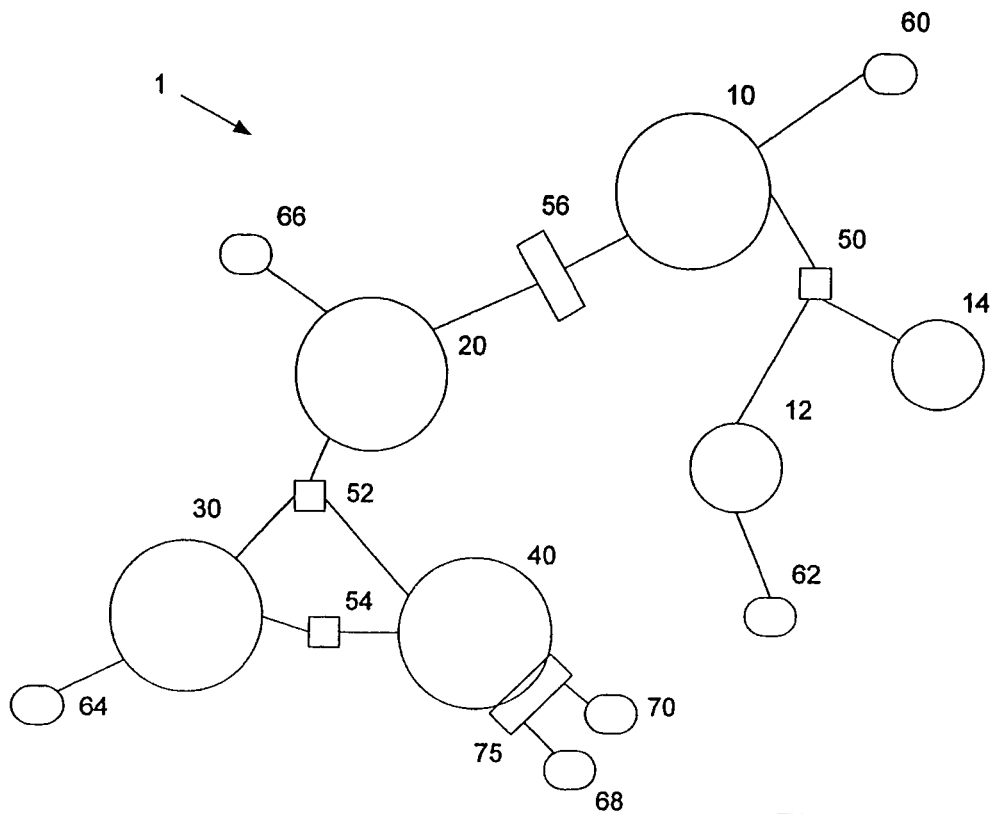
FIG. 1 is an example schematic diagram of a simple IP based network configuration.

FIG. 1 illustrates an example of a network configuration 1 on which a system according to the invention can be implemented. The configuration, also referred to as a structure or infrastructure, comprises a plurality of networks 10, 20, 30, 40 and subnets 12, 14 interconnected by routers 50, 52, 54, 56. Where appropriate, a router 56 may comprise a firewall providing packet filtering and facilities such as Network Address Translation (NAT), for example where a first network 10 is a private network and a second network 20 is a public network such as the Internet. A plurality of servers 60, 62, 64, 66, 68, 70, also referred to as hosts, nodes, endpoints and endnodes, are shown connected to various of the networks. The servers run application programs that communicate with other computers across the network structure. The network structure can include a variety of other network devices, such as load balancers 75.

Figure 2:
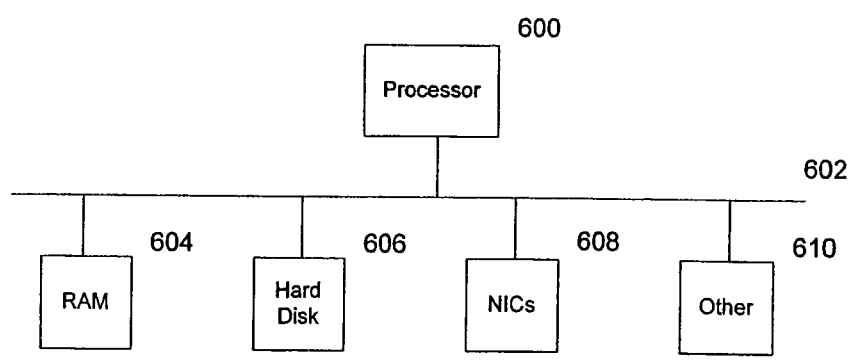
FIG. 2 is a schematic diagram of a server connected to the network of FIG. 1.

Each server 60, 62, 64, 66, 68, 70 is a conventional server computer, as is schematically illustrated in FIG. 2. For example, the server includes one or more processors 600, connected via a bus 602 to memory, (RAM) 604, a hard disk drive 606 providing local storage and one or more network interface cards (NIC) 608. The network interface card 608 is for example an Ethernet card, permitting connection of the server as part of an Ethernet network. Every Ethernet card has a unique address identifying the card, referred to herein as the Media Access Control (MAC) address. The bus 602 also connects to various other input/output systems and peripheral components and interfaces 610 as required for operation of the server, as would be understood by a person skilled in the art.

Figure 3:
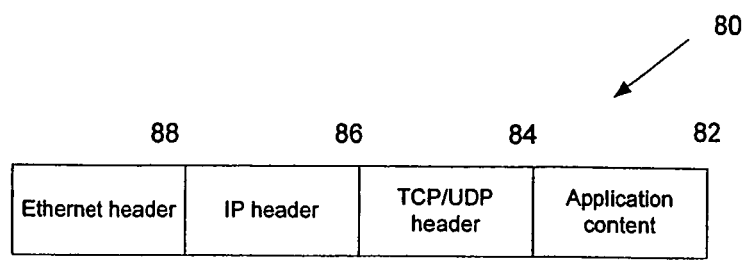
FIG. 3 is an illustration of a data packet that is capable of being routed between two nodes in the infrastructure of FIG. 1.

An example of the basic structure of a data packet 80 that can be communicated between nodes in the above network structure is illustrated in FIG. 3. The packet comprises application content 82, a TCP/UDP header 84, an IP header 86 and an Ethernet header 88. The TCP/UDP header 84 includes source and destination port information, the IP header 86 includes source and destination IP address information, while the Ethernet header 88 includes source and destination physical address information (MAC addresses). While a TCP or UDP header has been illustrated, it will be understood that depending on the nature of the data packet 80 this may be ICMP or any other TCP/IP protocol suite header.

Every node in the network structure, including routers, servers, firewalls, load balancers and so on, maintains information that defines how data packets should be routed through or from the node. The particular form the information takes depends on the nature of the device and is well known to a person skilled in the art. For example, in a router, the information is stored in a routing table, while in a firewall, the information may take the form of access control lists that determine which network traffic can pass through the firewall.

Figure 4A:
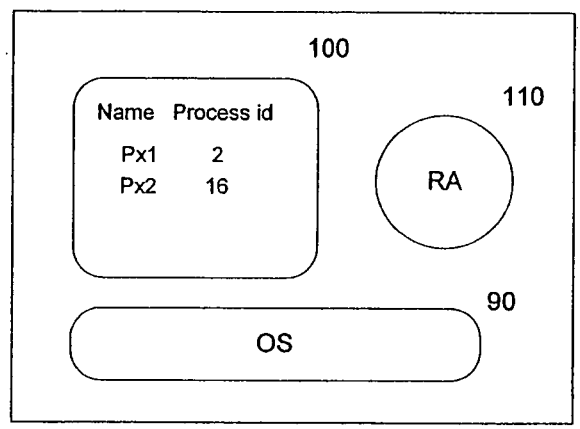
FIG. 4a is a schematic diagram illustrating the software and processes running on the servers that host the remote agent software.

FIG. 4a is a schematic illustration of the processes and software running on a local server 60, 62, 64, 68, 70 according to the invention. The server runs under the control of operating system software OS 90, which may be any operating system, for example, UNIX®, HP-UX®, Linux®, Windows® and so on. In operation, application programs on the server run as a number of processes 100, each process being identified by a name and a process identifier pid. The processes may be in different states and may or may not be communicating across the network structure. In addition, the server runs a program according to the invention which is referred to herein as a remote agent 110, the functionality of which will be explained in detail below.

Figure 4B:
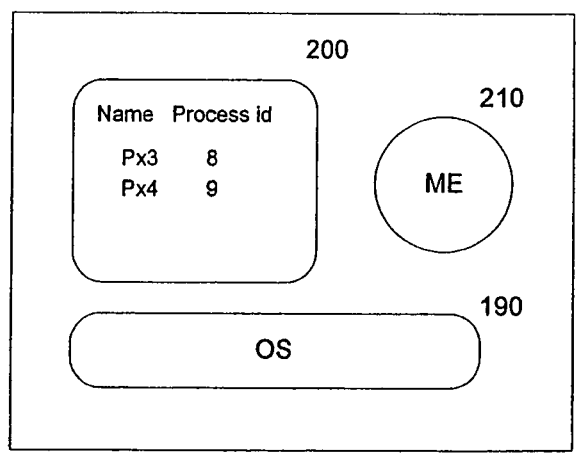
FIG. 4b is a schematic diagram illustrating the software and processes running on the server that hosts the mapping engine software.

FIG. 4b is a schematic illustration of the processes and software running on a central server 66 according to the invention. The central server 66 runs an operating system 190, a plurality of processes 200 and a program according to the invention referred to herein as a mapping engine 210, the functionality of which will be described in detail below.

It will be understood that the servers 60, 62, 64, 66, 68, 70 are conventional servers, which may or may not be similarly configured. The terms local server and central server are used for convenience of description only. A server on which remote agent software 110 is running is termed a local server and the server on which the mapping engine software 210 is running is termed the central server. Of course, a remote agent 110 can co-exist with the mapping engine 210 on the same server.

Figure 5:
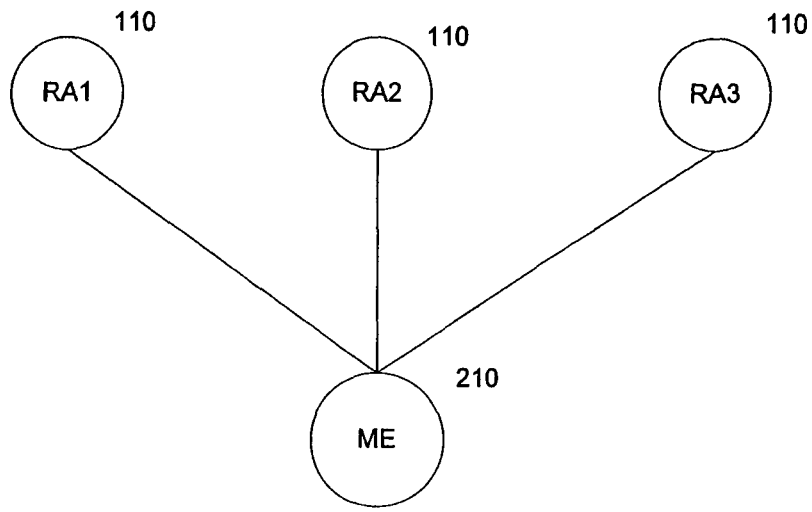
FIG. 5 is a schematic diagram of a system according to the invention, illustrating the relationship between the remote agents and mapping engine that make up the system.

FIG. 5 illustrates a system according to the invention illustrating more clearly the connection between the remote agents 110 and the mapping engine 210. The remote agent software is distributed to all endnodes in the network infrastructure. In general terms, the remote agents 110 log application process and network activities and send this information to the mapping engine 210.

The detailed functionality of the system will now be explained with reference to FIG. 6. Each remote agent first obtains a variety of information about the server on which it is hosted (step s1). After obtaining the above information, the remote agent forwards this to the mapping engine (step s2).

Alternatively, this information is stored at the remote agent for subsequent retrieval by the mapping engine. The mapping engine receives information from all of the remote agents distributed throughout the network structure (step s3). The mapping engine also receives and maintains information about other network devices, for example where this information is not or cannot be provided by the remote agents (step s4). This includes initial discovery of the devices in the network, which can be done using existing network mapping techniques, for instance as done by the autodiscovery mode of HP® OpenView Network Node Manager. The mapping engine 210 processes the information (step s5), as will be described in detail below, and outputs the results to appropriate software for display (step s6). It will be understood that the operations described in the above flow chart do not need to be performed in the specified sequence. In particular, the mapping engine may receive network device information (step s4) in a variety of ways, for example, on a continuous or batch basis, in parallel with or independently of the receipt of remote agent information (step s3), as will be explained in more detail below.

It will further be understood by the skilled person that the division of tasks between the remote agents 110 and the mapping engine 210 is highly configurable. Therefore, the nature of the information gathered by the remote agents 110 and transmitted to the mapping engine 210 depends on the extent to which processing of the information is to be done locally by each remote agent or is to be done centrally by the mapping engine. This will in turn depend on the nature of the network, for example, whether it is more efficient to carry out the computation at the remote servers and to transmit the results to the mapping engine, or to transmit the gathered information to the mapping engine for processing. This in turn depends on factors such as the network bandwidth and the amount of processing power and storage capacity that is available at each of the servers.

In one embodiment, the information gathered by the remote agents 110 comprises:

1. The local server's network interface details, for every configured interface, including its MAC address, its IP address and the subnet mask. The subnet mask determines the portion of the IP address that is used for the host address as opposed to the network address.

2. The routing table in effect at the server. The routing table associates each possible destination network with the gateway that is required to reach the network. Knowing the routing table can ease the analysis efforts of the mapping engine.

3. The Address Resolution Protocol (ARP) table. The ARP table, also known as the ARP cache, translates IP addresses to MAC addresses. When an appropriate gateway is identified by an IP address from the routing table, the ARP table is used to map the IP address of the destination to its physical address.

4. A list of the current processes 100 executing on the local server. Knowledge of all processes permits the system to link communicating processes with parent non-communicating processes to build up associations between data flows and processes, and therefore ultimately between data flows and applications. For example, this information can be obtained by using the UNIX® ps command on a UNIX® based system, or its equivalent under other operating systems, to provide a snapshot of the global process table. Optionally, the remote agent can obtain the complete process tree for each process. This increases the execution time of the remote agent and hence its impact on the server being monitored, but decreases the complexity of the mapping engine. The intervals at which snapshots are taken should not overlap or cycle too quickly, to ensure that snapshots are taken at intervals across the bulk of the normal working cycle, so giving a better picture of network traffic.

5. A list of the processes communicating over the network to which the server is connected. This can be obtained by using the UNIX® netstat command, lsof command or their equivalents. However, netstat output will only show listening and transmitting TCP sockets and listening UDP sockets. It will not show outbound UDP traffic nor inbound and outbound Internet Control Message Protocol (ICMP) traffic. Such information can alternatively be obtained by the use of operating system kernel hooks, also referred to as system calls. Other methods include the use of system and process level auditing, packet filtering logs and so on.

For each communicating process, the agent gathers the following information:
A. the destination IP address;
B. the destination MAC address;
C. the identity of the protocol;
D. the ports in use, where applicable;
E. the process identifier pid and parent process identifier ppid from which the process was created.

6. Network traffic samples. The remote agent may optionally capture samples of network traffic originating from or terminating at the local server. Capturing network traffic increases the local storage requirements, CPU overhead and network bandwidth consumed when the captured traffic is forwarded to the mapping engine for analysis. However, it can create a more accurate picture of network usage compared to the alternative approach of taking snapshots of the current network sockets in use. The monitoring and capture of network traffic needs to be synchronised with snapshots of the process table described in 1. above. This may occur either by process snapshots triggering network captures or by network captures triggering processing snapshots, or alternatively by some continual monitoring of both.

In performing network captures, additional factors that need to be considered include the duration of network monitoring and packet capture periods, limits on the number of packets that should be captured and/or limits on the volume of data stored, how many process table snapshots are to accompany the network monitoring, where in the monitoring period the snapshots are taken and the impact on the server of the network monitoring, for example the risk of packet loss, increased network latencies, disk usage and so on.

In one example, the remote agent performs periodic live analysis of the network traffic and triggers process snapshots on detection of a new stream, socket or conversation. For example, a process snapshot or information capture is triggered when there is a change in one or more network traffic attributes, such as protocol, destination IP address, destination port, source IP address, source port and ICMP type or subtype. There may for example be a change in the source IP address if the local server has multiple interfaces or uses multiple virtual IP addresses.

Once the remote agents have acquired the necessary information, this is communicated to the mapping engine in any suitable way (step s2 in FIG. 6), for example, by an immediate push of the data to the mapping engine, by a scheduled push of the data at predetermined times, or by storage of the data at the local servers and periodic polling of the data by the mapping engine.

Communications between the remote agents and the mapping engine can be authenticated and/or encrypted.

Figure 6:
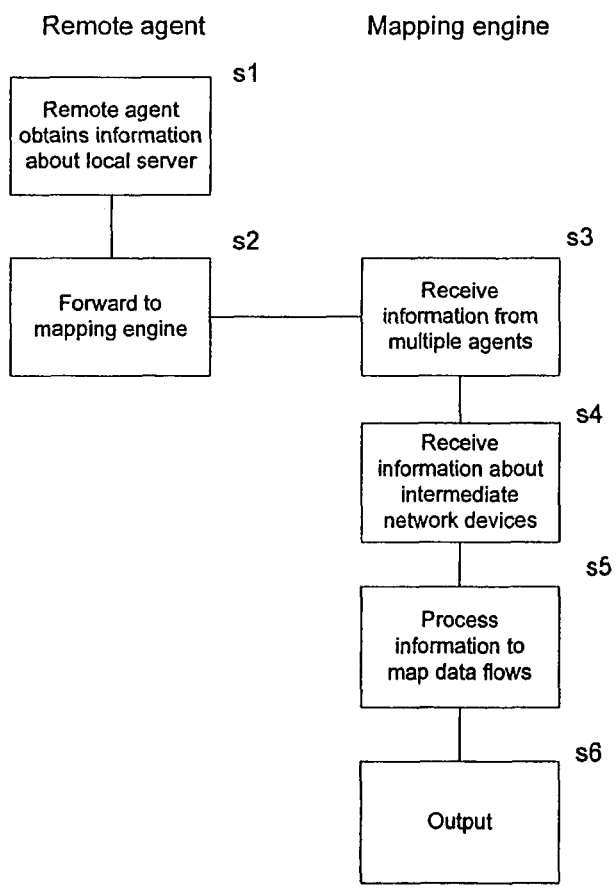
FIG. 6 is a flow diagram illustrating the operation of the system of FIG. 5.

In addition to the information provided by the remote agents, the mapping engine obtains other information that it requires and that the remote agents cannot directly provide (step s4 in FIG. 6). This information includes routing tables for intermediate networks, load balancer maps, network address translation and port address translation tables, firewall, router and switch access control lists and so on for all devices other than the endpoints.

This information is obtained in a variety of ways, including periodic uploading of network device configuration files into the mapping engine, polling of a central repository for the latest configuration files when required, with temporary caching of results to improve performance, Simple Network Management Protocol (SNMP) querying of network devices by the mapping engine, passive monitoring of the network for updates to routers and other network devices, for example via Trivial File Transfer Protocol (TFTP), and active reception of router table update messages from routing devices.

In another example implementation, the mapping engine 210 receives information about the same network devices both from the remote agents 110 and from its other sources. It can then compare this information and indicate an error if the information is not the same, or replace the incorrect information with the correct information if it knows that one set of information is likely to be more correct than the other. For example, the mapping engine may assess that information obtained directly from a network device is likely to be more correct than information received via a remote agent.

Once it has all of the required information, the mapping engine 210 collates the information from all of the remote agents and decodes the information (step s5 in FIG. 6). Programmatic interpretation of routing tables, load balancer translation maps and so on is well known. The processing of the received information can be done as data is received or changes are noted, for example, in data from remote agents or updated network device information, or at scheduled intervals.

Figure 7:
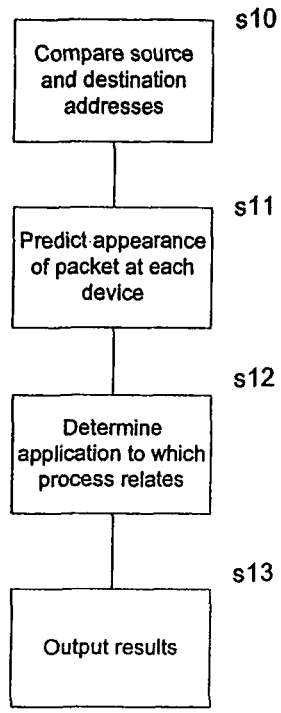
FIG. 7 is a flow diagram of the processing carried out by the mapping engine.

One example of the decoding of the collated information is described in detail below, with reference to FIG. 7. For example, when an arbitrary application on a local server 60, 62, 64, 68, 70 starts a new conversation, information from the packet headers is recorded by a remote agent 110 at the local server and transmitted to the mapping engine 210 (step s2 in FIG. 6). The mapping engine performs a comparison of the source and destination address information to determine whether the two endpoints are in the same subnet or are on opposite sides of one or more routers (step s10). The comparison, including MAC and ARP information, informs the mapping engine of the route at which it should start the mapping process. It also enables the mapping engine to determine if any other network devices exist between the source and the next hop router, or between the source and the destination. The mapping engine 210 has previously acquired knowledge of the intermediate devices (step s4 in FIG. 6). It applies its knowledge of the device configuration information to predict the appearance of the packet at each of the network devices (step s11), as will be described in more detail below. The mapping engine also knows from the remote agent information the identity of the server process to which the traffic flow relates and also has information about the server process tree. Alternatively, it can determine the server process tree from the information sent by the remote agent. In either case, it can then identify the application to which the process relates (step s12). It will be understood that these tasks (steps s11 and s12) could occur in any order or in parallel with one another.

In another embodiment, the remote agent can compare the endpoints itself to determine whether these lie on the same subnet, so removing processing load from the mapping engine.

The results from the mapping engine can be supplied to a variety of other applications for display or further processing (step s13). For example, they can be used by tools such as HP® OpenView Service Desk to map in real-time how a failure at any low level process or network device impacts a service. A real-time display allows for dynamic changes to firewall, routing, NAT, PAT, load balancer tables and so on to be accounted for as they happen. Alternatively, in a predictive mode, the results can be used to predict how a service might be impacted by network changes and failures.

The results can also be output into other applications such as Microsoft® Visio®, or output in the form of textual descriptions. An entire end to end network path can be diagrammed with all intermediate paths and transformations shown.

Figure 8:
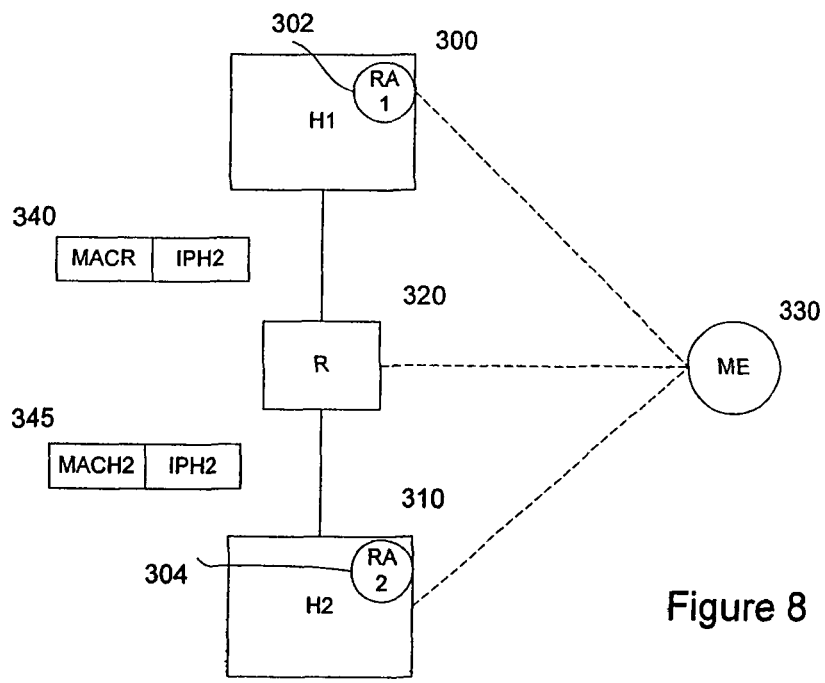
FIG. 8 is a schematic diagram illustrating the form of data packets at different points in an example network configuration.

FIG. 8 shows an example diagram of a communication path between two hosts H1 300 and H2 310 separated by a router R 320. Remote agents RA1 302 and RA2 304 exist at each of the hosts. A mapping engine ME 330 runs on another host (not shown) and receives information from the remote agents and information about routing table at the router, as indicated by the dotted lines. The mapping engine is aware of the source and destination IP addresses of a packet sent from the host H1 300 to the host H2 310 from the remote agent 302 at the host 300, as well as the MAC address of the packet, which is the MAC address of the router R. It is also aware from the information gathered by the remote agent 304 at the host 310 that the host 310 corresponds to the destination IP address.

On the link between host H1 and router R, the data packet 340 is therefore shown to have a destination physical address MACR, being the destination MAC address of the router, and an IP address of IPH2, being the destination IP address of host H2. Since the mapping engine knows the routing and ARP tables of the router R, it can predict that the form of the data packet 345 on the link between the router R and the host H2 will be that the packet will have the MAC address of host H2, namely MACH2, while the IP address will remain unchanged.

In a further example of the different possible split between the functionality of the remote agents and that of the mapping engine, the remote agent can perform a degree of network mapping. For example, for a packet to a new endpoint, the remote agent can trigger a UNIX® traceroute or equivalent command in an attempt to determine the path taken by the packet. The success of this approach depends on the network security policy in place and would increase the workload on the local server.

In another example, if ICMP and/or UDP based traceroute operations are permitted across a network, this facility can be used to simplify the functionality of the mapping engine, as described in detail below. If standard ICMP and/or UDP based traceroute messages are not permitted, then other methods of determining the route can be attempted.

The remote agent monitors the server for new outbound network packets, for example packets to a new destination address, as explained above in relation to snapshots and network capture. For each new destination address, the remote agent customises and sends a traceroute or ping packet, as permitted by the local security policy. The customisation is in the payload of the packets, which would normally be ignored, other than an optional check to ensure the overall packet checksum remains intact. The payload content is modified to include the original source and endpoint, as well as detail of the application using the data path. Remote agents running on other servers monitor for the customised packets. If detected, the observation is reported to the mapping engine. The report includes the customised contents of the payload, as well as the network packet header information seen by the reporting remote agent. The mapping engine can therefore determine how the packet had been modified at or prior to that point.

However, the customised traceroute packets will only be detected at servers running remote agents, and not on subnets consisting solely of network devices, unless these devices can be modified to implement the detection functionality. This is possible for devices running a common operating system such as Microsoft Windows or Unix. This includes firewalls running Checkpoint FW1 on Unix/Windows® and Network Intrusion Detection sensors such as Real Secure and Snort. It is also possible for intelligent access control lists on routers and switches that are able to perform packet inspection and remote logging. It is also possible for remote agents to be located on servers attached to the span/mirror port on intermediate switches.

While example implementations of the invention have been described, it will be apparent to the skilled person that many different implementations are possible. For example, while the network infrastructure has been described with reference to Ethernet, the nature of the networking technology is immaterial and the system could be implemented on networks using other networking technologies, including but not limited to FDDI, ATM and so on. Similarly, while implementations of the invention have been described in terms of IP networks, the invention is not limited to this, but can be extended to networks operating under other network protocols.

While the mapping engine software has been described as running on a central server, it is envisaged that the functionality of the mapping engine is distributed throughout the network. For example, the mapping engine software has a master component and multiple slave components to perform processing of received data. The slave components are, for example, located at key subnets to even out the processing load on the mapping engine. The master mapping engine aggregates the mappings performed by the slave engines. This in addition assists in providing a level of resilience in the overall system.

While exemplary embodiments of the invention have been described above, modifications to these embodiments and variations thereof would be apparent to a person skilled in the art, without departing from the principles and spirit of the present invention as defined in the claims and their equivalents.

The invention claimed is:

1. A system for determining data flows within a network configuration, the network configuration comprising a plurality of nodes and a plurality of network devices through which data is routed between the nodes, each of the nodes having a plurality of processes executing thereon, the system comprising:
   a plurality of remote agents configured to gather information about corresponding ones of the plurality of nodes, wherein the gathered information at each of the plurality of nodes includes a list of the processes at the corresponding node and network traffic samples of network traffic captured at the corresponding node; and
   a mapping engine configured to receive the gathered information from each of the remote agents, wherein the mapping engine is configured to determine the data flows based on the gathered information from the remote agents and configuration information relating to the network devices, wherein the configuration information comprises information defining how a network device processes data arriving at the network device,
   wherein each of the remote agents is located at a corresponding one of the nodes and is configured to obtain information about the processes executing on the corresponding node.

2. A system according to claim 1, wherein the mapping engine is configured to receive from the remote agents, the configuration information.

3. A system according to claim 1, wherein the mapping engine is configured to receive the configuration information from sources other than from the remote agents.

4. A system according to claim 3, wherein the mapping engine is configured to receive the configuration information by one or more of periodic uploading of configuration files into the mapping engine, polling a storage area for the configuration files, querying the network devices, monitoring of network updates of the network devices, and reception of update messages from the network devices.

5. A system according to claim 1, wherein the nodes comprise endnodes, said endnodes comprising respective servers on which a plurality of applications are executable, each of said applications giving rise to one or more processes.

6. A system according to claim 1, wherein the list of the processes in the gathered information comprises at least one of a list of processes currently executing in the respective node and a list of processes in the respective node communicating over the network configuration.

7. A system according to claim 6, wherein the gathered information from each of the remote agents further comprises network interface details for each network interface supported by the respective node.

8. A system according to claim 1, wherein the gathered information from each of the remote agents further comprises routing information defining how data packets are routed from the respective node to a destination.

9. The system of claim 1, wherein the configuration information includes routing tables of the corresponding network devices through which data between the nodes is routed.

10. The system of claim 9, wherein the configuration information includes network address translation tables of the corresponding network devices.

11. The system of claim 10, wherein the configuration information includes access control lists of the corresponding network devices.

12. The system of claim 1, wherein the gathered information from each of the nodes includes translation information to translate between an Internet Protocol (IP) address and a Media Access Control (MAC) address.

13. The system of claim 1, wherein the mapping engine is configured to provide output to cause graphical representation of the data flows, wherein the graphical representation of each of the data flows shows an end-to-end network path including one or more of the network devices between corresponding nodes.

14. A system for determining data flows within a network configuration, the network configuration comprising a plurality of nodes and a plurality of network devices through which data is routed between the nodes, each of the nodes having a plurality of processes executing thereon, the system comprising:
   a plurality of remote agents configured to gather information about corresponding ones of the plurality of nodes, wherein the gathered information at each of the plurality of nodes includes a list of the processes at the corresponding node and network traffic samples of network traffic captured at the corresponding node; and
   a mapping engine configured to receive the gathered information from each of the remote agents, wherein the mapping engine is configured to determine the data flows based on the gathered information from the remote agents and configuration information relating to the network devices, wherein each of the remote agents is located at a corresponding one of the nodes and is configured to obtain information about the processes executing on the corresponding node, wherein the system is configured to link the determined data flows to one or more of the processes executing on one of the nodes.

15. A system according to claim 14, configured to link the determined data flows to an application executing on the one node based on processes started by the application.

16. A method for determining data flows within a network configuration, the network configuration comprising a plurality of nodes and a plurality of network devices through which data is routed between the nodes, the method comprising:

gathering information about each of the plurality of nodes using a remote agent at each of the plurality of nodes, the gathered information comprising information about a plurality of processes executing on each of the plurality of nodes and routing information for routing data packets at each of the plurality of nodes;

receiving the gathered information from each of the remote agents at a mapping engine on a further node, the mapping engine determining the data flows based on the gathered information from the remote agents and configuration information relating to the network devices; and linking, using the information about the plurality of processes, the data flows to one or more processes executing on one or more of the plurality of nodes.

17. A method according to claim 16, further comprising displaying the data flows in real-time.

18. A method according to claim 16, wherein the gathered information about each of the plurality of nodes further comprises network traffic samples of network traffic captured at the corresponding nodes.

19. A method according to claim 16, wherein the gathered information about each of the plurality of nodes includes translation information to translate between an Internet Protocol (IP) address and a Media Access Control (MAC) address.

20. A method according to claim 16, wherein the configuration information includes routing tables of the corresponding network devices through which data between the nodes is routed.

21. A method according to claim 20, wherein the configuration information includes network address translation tables of the corresponding network devices.

22. A method according to claim 21, wherein the configuration information includes access control lists of the corresponding network devices.

23. A method according to claim 16, further comprising the mapping engine providing output to cause graphical representation of the data flows, wherein the graphical representation of each of the data flows shows an end-to-end network path including one or more of the network devices between corresponding nodes.

24. A system for determining data flows within a network configuration, the network configuration comprising a plurality of nodes and a plurality of network devices through which data is routed between the nodes, each of the nodes having a plurality of processes executing thereon, the system comprising:

a plurality of remote agents configured to gather information about corresponding ones of the plurality of nodes, wherein the gathered information at each of the plurality of nodes includes a list of the processes at the corresponding node and network traffic samples of network traffic captured at the corresponding node; and a mapping engine configured to receive the gathered information from each of the remote agents, wherein the mapping engine is configured to determine the data flows based on the gathered information from the remote agents and configuration information relating to the network devices, wherein each of the remote agents is located at a corresponding one of the nodes and is configured to obtain information about the processes executing on the corresponding node, wherein the mapping engine is configured to link the data flows to corresponding ones of the processes based on the lists of processes gathered by the remote agents.

25. A system for determining data flows within a network configuration, the network configuration comprising a plurality of nodes and a plurality of network devices through which data is routed between the nodes, each of the nodes having a plurality of processes executing thereon, the system comprising:

a plurality of remote agents configured to gather information about corresponding ones of the plurality of nodes, wherein the gathered information at each of the plurality of nodes includes a list of the processes at the corresponding node and network traffic samples of network traffic captured at the corresponding node; and a mapping engine configured to receive the gathered information from each of the remote agents, wherein the mapping engine is configured to determine the data flows based on the gathered information from the remote agents and configuration information relating to the network devices, wherein each of the remote agents is located at a corresponding one of the nodes and is configured to obtain information about the processes executing on the corresponding node, wherein the mapping engine is configured to predict a form of a data packet in a link between one of the nodes and one of the network devices based on the configuration information, wherein the predicted form of the data packet includes a predicted address contained in the data packet.

26. A method for determining data flows within a network configuration, the network configuration comprising a plurality of nodes and a plurality of network devices through which data is routed between the nodes, the method comprising:

gathering information about each of the plurality of nodes using a remote agent at each of the plurality of nodes, the gathered information comprising information about a plurality of processes executing on each of the plurality of nodes and routing information for routing data packets at each of the plurality of nodes;

receiving the gathered information from each of the remote agents at a mapping engine on a further node, the mapping engine determining the data flows based on the gathered information from the remote agents and configuration information relating to the network devices; and the mapping engine predicting a form of a data packet on a link between one of the nodes and one of the network devices based on the configuration information, wherein the predicted form of the data packet includes a predicted address contained in the data packet.

* * * * *

UNITED STATES PATENT AND TRADEMARK OFFICE
CERTIFICATE OF CORRECTION

| | | |
|---|---|---|
| PATENT NO. | : 8,898,265 B2 | Page 1 of 1 |
| APPLICATION NO. | : 11/474117 | |
| DATED | : November 25, 2014 | |
| INVENTOR(S) | : Mark Cooper et al. | |

It is certified that error appears in the above-identified patent and that said Letters Patent is hereby corrected as shown below:

On the title page, above item (51), Int. Cl., in column 1, insert -- Foreign Application Data 0512832.7(UK)........Jun. 24, 2005 --, therefor.

Signed and Sealed this
Twenty-sixth Day of May, 2015

Michelle K. Lee
*Director of the United States Patent and Trademark Office*